United States Patent [19]

Hillman et al.

[11] 3,734,507
[45] May 22, 1973

[54] BOARD GAME APPARATUS

[76] Inventors: Arnold R. Hillman, 25821 Telegraph Rd., Flat Rock, Mich. 48134; Harvey T. Winckles, 14942 S. Dixie Highway, Monroe, Mich 48161

[22] Filed: Aug. 13, 1971

[21] Appl. No.: 171,664

[52] U.S. Cl. ............................................. 273/134 A
[51] Int. Cl. ............................................... A63f 3/00
[58] Field of Search ..................... 273/85, 88, 89, 93, 273/94, 131, 134

[56] References Cited

UNITED STATES PATENTS

| | | | |
|---|---|---|---|
| 2,029,834 | 2/1936 | Prentice | 273/94 R |
| 2,260,467 | 10/1941 | LeMay | 273/94 R |
| 2,517,460 | 8/1950 | Arnn | 273/134 CF UX |
| 3,413,002 | 11/1968 | Welch | 273/134 A X |
| 3,545,758 | 12/1970 | Payne | 273/94 R |
| 3,559,992 | 2/1971 | Kramer | 273/94 R |

*Primary Examiner*—Delbert B. Lowe
*Attorney*—A. Yates Dowell, Jr.

[57] ABSTRACT

Apparatus including a game board on which movable playing pieces of different categories are mounted and computer cards to determine the number of moves to be made and indicate the categories of the playing pieces involved, the moves being selectively controlled by individual players. A card sensing mechanism is disposed at each end of the board, and signal lights are arranged to indicate the results of the sensing. The game combines chance and skill to reach a predetermined point value.

7 Claims, 9 Drawing Figures

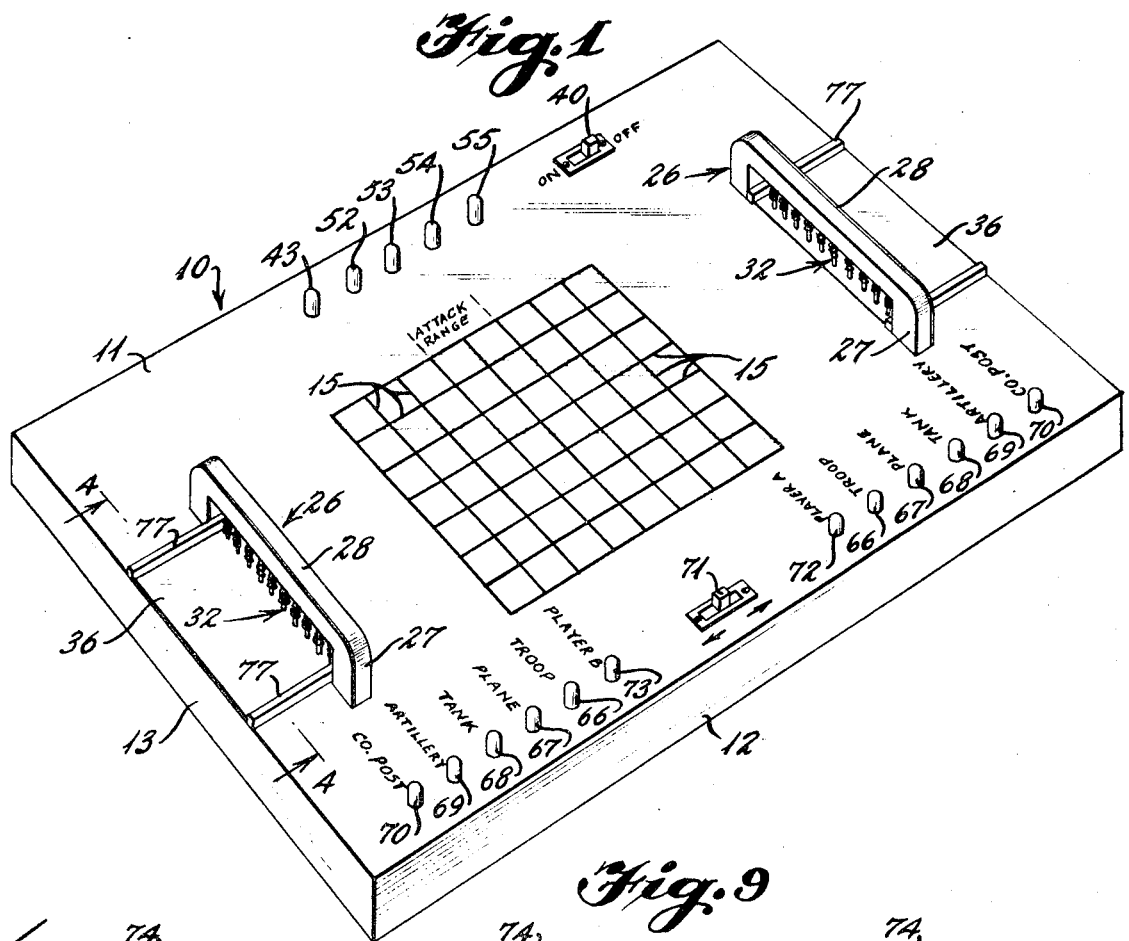
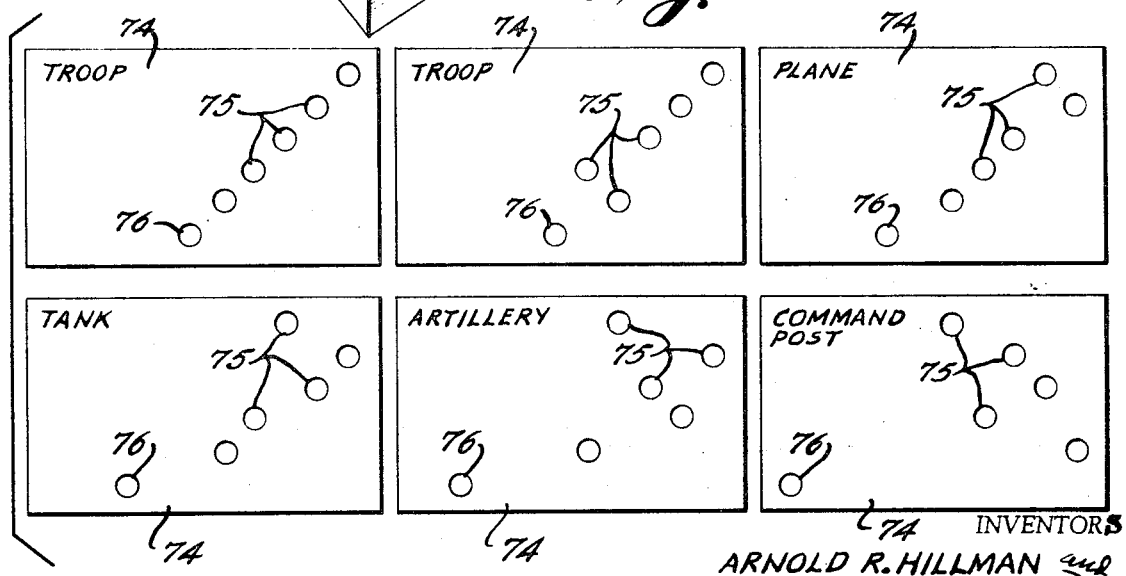

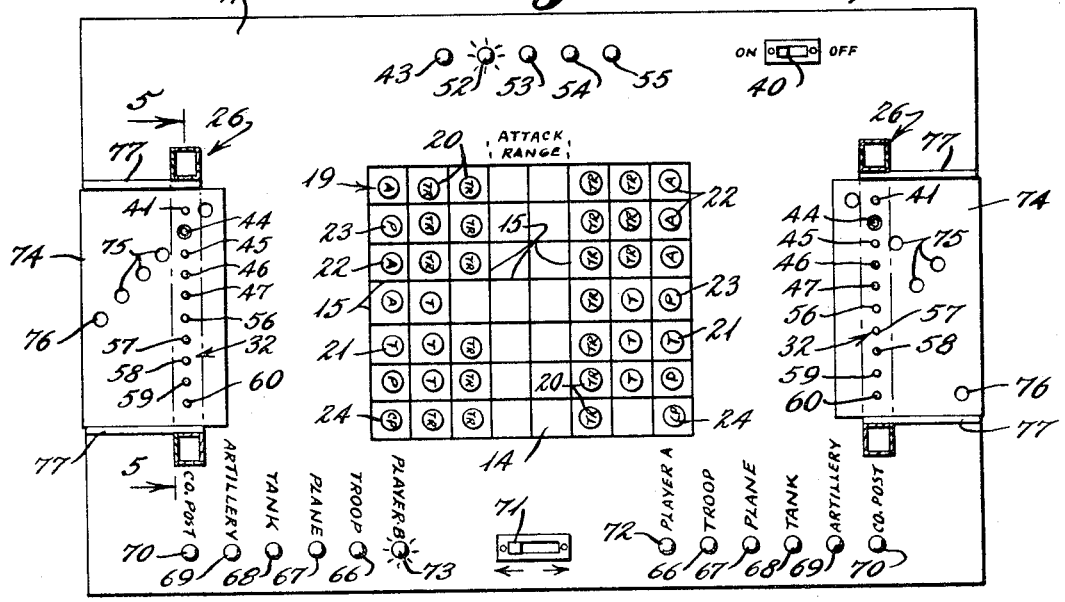

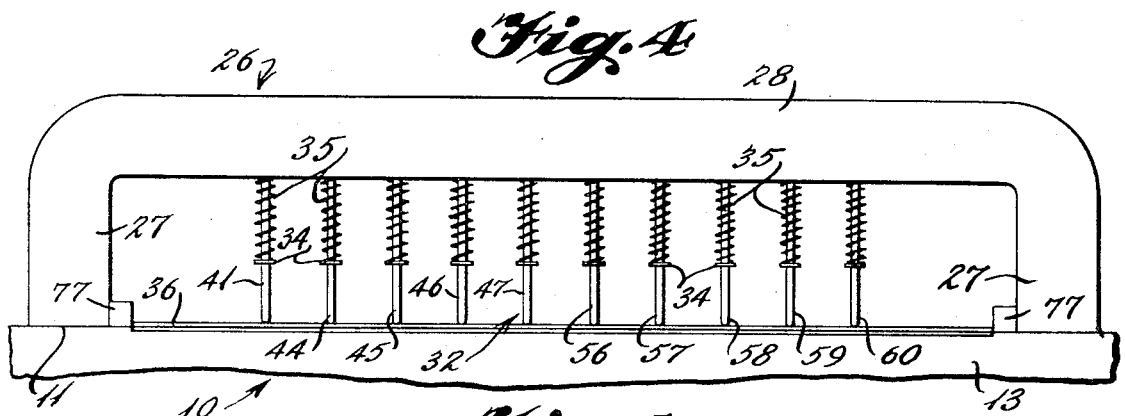
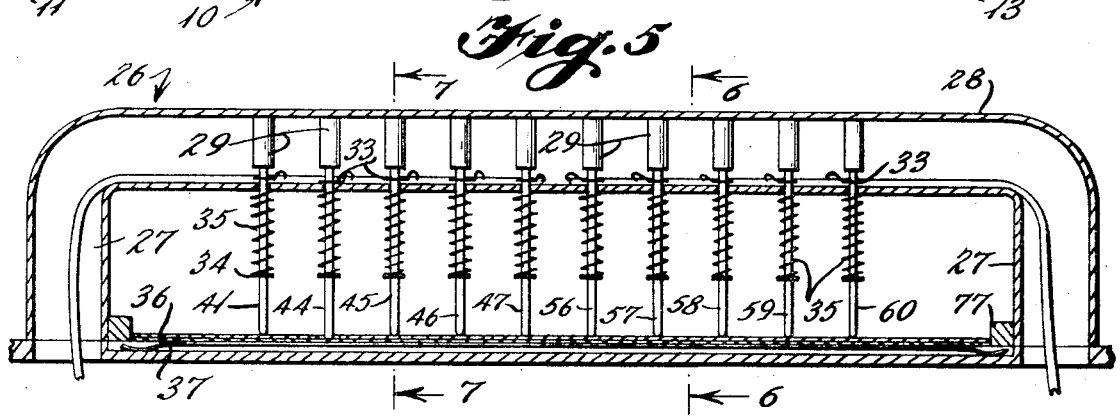
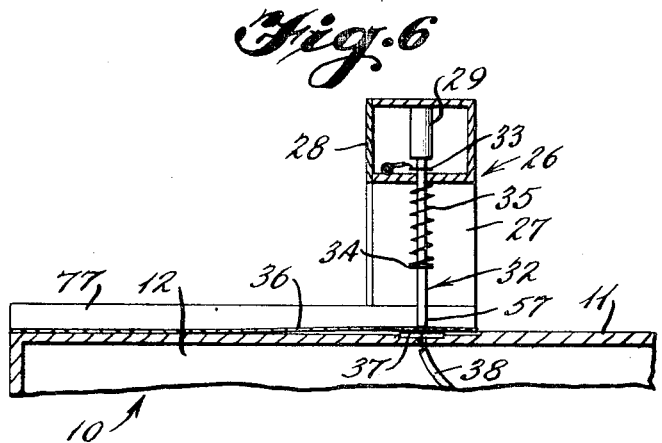
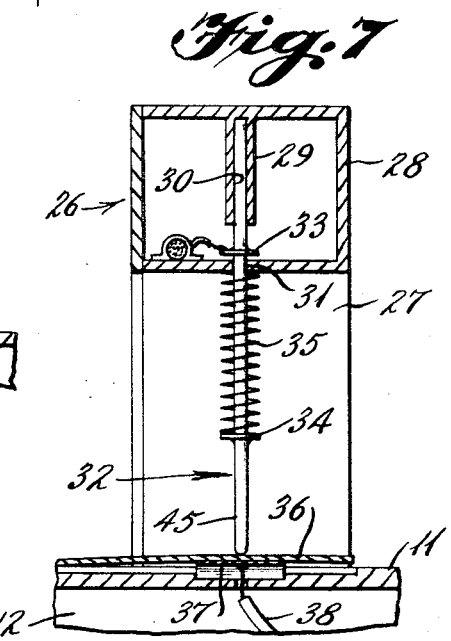
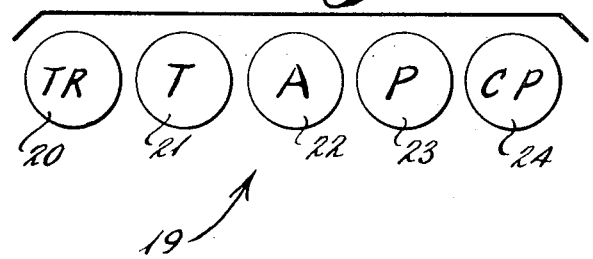

3,734,507

BOARD GAME APPARATUS

BACKGROUND OF THE INVENTION

1. Field of the Invention

This invention relates generally to entertainment and games of various kinds, and relates particularly to games for two players with playing pieces and computer cards for indicating the number of moves to be made as well as the category of the offensive and defensive pieces involved but with the actual moves being selected by the players.

2. Description of the Prior Art

Heretofore many games have been provided including electrical apparatus for interpreting information supplied by opposing players. However, most of these devices have been automatically operated so that when the information is supplied by the players, it will be compared with information supplied prior to the start of the game and a result will be indicated. Some examples of this type of structure are the U.S. Pats. to Davis, No. 2,843,381; Meyer, No. 2,898,108; Ryan, No. 3,127,174; Anderson, No. 3,376,041; Becker, No. 3,438,628; and Kramer, No. 3,559,992.

Other apparatus has been provided for reading and interpreting punched cards, such as the U.S. Pat. to Hurms et al., No. 1,889,902; however, this device is dependent upon several parameters which must be considered before the correct answer is given.

Other prior art games, such as chess and checkers, have included a game board with selectively movable playing pieces which are moved manually in accordance with the skill and strategy of the opponents.

SUMMARY OF THE INVENTION

The present invention is a game of chance and skill to be played by two players or two teams of players and in which certain phases are controlled by computer operations and other phases are performed manually in accordance with the skill and strategy of the players. The apparatus includes a game board having a plurality of playing pieces movably mounted thereon with such pieces being divided into multiple categories, having a predetermined number of pieces in each category and with each piece having a predetermined point value. Each player has a quantity of prepunched computer cards for each category from which a selected card is passed through computer mechanisms on the board. Apparatus is provided on the board for interpreting the information on the cards and indicating the number of moves and the category of the attacking piece, as well as the category of the piece being attacked, although the actual route of the attacking piece is determined by the individual offensive player. The offensive player determines the category of the piece being attacked and the defensive player determines the category of the offensive piece which must do the attacking.

It is an object of the invention to provide a game which combines an element of chance with an element of skill in which the number of moves and the categories of the pieces involved are determined by a computer, while the actual piece and route of movement are determined by the skill of the offensive player.

BRIEF DESCRIPTION OF THE DRAWINGS

FIG. 1 is a perspective of the game board.

FIG. 2 is a top plan view of the game board with the playing pieces in a selected position and the computer cards located in position in the computer.

FIG. 3 is an electrical wiring diagram of the game board.

FIG. 4 is an enlarged section on the line 4—4 of FIG. 1.

FIG. 5 is an enlarged section on the line 5—5 of FIG. 2.

FIG. 6 is a section on the line 6—6 of FIG. 5.

FIG. 7 is an enlarged section on the line 7—7 of FIG. 5.

FIG. 8 is a top plan view of a plurality of playing pieces.

FIG. 9 is a plan view of a plurality of computer cards.

DESCRIPTION OF THE PREFERRED EMBODIMENT

With continued reference to the drawings, a game board 10 is provided having an upper surface 11 and side and end walls 12 and 13, respectively, defining a hollow compartment beneath the upper surface 11. If desired a bottom wall (not shown) may be provided to completely enclose the hollow compartment.

A playing field 14 is located centrally of the upper surface 11 and such field is provided with longitudinal and transverse lines or other division markers 15 arranged in such a manner that the playing field is divided into squares or other areas arranged in rows and columns. In the particular playing field illustrated in the drawings, eight rows and seven columns are provided to form 56 squares or playing piece receiving areas.

Two players or two teams of players position themselves at opposite ends of the game board 10 and are designated player A and player B. Each player has a predetermined number of playing pieces 19 with such pieces being separated into different categories and with each category containing a predetermined number of pieces. A designated point value is assigned to each of the pieces 19 and such pieces can be arranged in any desired positions on the playing field 14.

It is contemplated that the playing pieces could indicate any desired members; however, the drawings illustrate members used in a war game and therefore the remainder of the description will be directed toward this concept. It will be apparent, however, that the pieces could indicate any competitive sport, such as football or the like, or could indicate any other competitive organization, such as business associations, stock market, real estate or the like.

With reference to FIGS. 2 and 8, the playing pieces 19 indicate different categories including troops 20, tanks 21, artillery 22, planes 23, and command post 24. Each player is provided with 20 playing pieces, including 10 troops 20, four tanks 21, three artillery pieces 22, two planes 23, and one command post 24. Each piece of each category has been assigned a given numerical value so that each troop 20 is worth two points, each tank 21 and each artillery piece 22 is worth three points, each plane is worth four points, and the command post is worth six points. The playing pieces are placed on the playing field 14 in any desired arrangement in the first three rows adjacent to the players' sides of the field. With this arrangement the two center rows are unoccupied at the beginning of play and are designated as the attack range.

Adjacent to each end of the game board 10 is a bridge 26 of generally hollow construction including generally upright posts 27 connected by a span 28. As illustrated in FIGS. 5–7, the upper portion of each span 28 includes plurality of downwardly extending lugs 29 each of which is provided with an axial bore 30 and the lower portion of each span is provided with a plurality of openings 31 arranged in generally axial alignment with the bores 30. A plurality of probes 32 are provided with the upper portions of such probes extending through the openings 31 and being axially slidably mounted within the bores 30 of the lugs 29. A stop plate 33 is welded or otherwise attached to each of the probes between the bore 30 and the opening 31 to limit axial movement of the probes.

Each probe has a shoulder or spring retainer 34 fixed thereto intermediate the span 28 and the game board 10, and a spring 35 is located between the retainer 34 and the lower portion of the span 28 to urge the probes 32 downwardly. A base plate 36 of electroconductive material such as sheet metal or the like is located below the span 28 and preferably is anchored along one edge to the upper surface 11 while the opposite edge is raised slightly above the upper surface by a spring 37.

As illustrated in FIGS. 3 and 6, each of the base plates 36 is connected by a conductor 38 to a battery 39 controlled by an on-off power switch 40 located in any convenient position. The first probe 41 of each bridge is connected by a conductor 42 to a light or other indicator 43 so that when the first probes 41 at opposite ends of the game board engage the bases 36, a circuit will be completed to energize the light 43. Similarly the next four probes 44, 45, 46 and 47 are connected by conductors 48, 49, 50 and 51 to lights 52, 53, 54 and 55, respectively. The lights 43 and 52–55 preferably are mounted along one side of the upper surface 11 so that they are clearly visible to both players for a purpose which will be described later.

Five additional probes 56–60 are mounted along the length of each of the spans 28 and are connected by conductors 61–65 to lights or indicators 66–70 for each player. The lights 66–70 represent different categories of playing pieces for each player and are located in any convenient position where they are readily visible to both players, such as along the side of the upper surface 11 remote from the lights 43 and 52–55. As illustrated in FIGS. 1 and 2, each of the lights 66–70 is provided with nomenclature located adjacent thereto which indicates the category represented by each individual light. Preferably the lights 66–70 are arranged generally in alignment with each other at each end of the upper surface and intermediate such lights is a three-position selector switch 71 for selectively controlling a pair of lights 72 and 73 connected by conventional circuitry to the battery 39. The switch 71 is operated to alternately energize the lights 72 and 73 to indicate the offensive player.

With reference to FIGS. 2 and 9, each player is provided with a plurality of prepunched computer cards 74 each of which has a plurality of openings arranged in predetermined locations and through which the probes 32 are adapted to project. In the preferred embodiment, each player has a plurality of cards for each category and the openings of each card in the same category are arranged in different patterns. As an example, each player has six cards for each of the five categories or a total of 30 cards. Approximately half of each card is arranged in five imaginary rows and five imaginary columns with one column of each row having an opening 75. In other words, each of the five rows will have only one opening and such openings will be in separate columns.

The openings 75 are arranged in predetermined patterns so that the patterns of the cards of one category will all be different. However, the patterns of the openings in the cards of other categories may be substantially identical with the patterns of the openings in the cards of the first category. The openings of each category are arranged so that when a card is selected by each player, it is possible that none of the openings will be in the same relative location on both cards; or from one to five openings on one player's card can be located in the same row and column as the openings in the opponent's card.

The holes 75 located along the imaginary rows and columns in one-half of the card are to determine the number of squares on the playing field 14 that the offensive player can move.

The other half of the card is provided with a single row spaced lower down on the card than the rows on the first half, and such lower row is divided into five imaginary columns or locations with an opening 76 provided at one of the locations. The opening 76 on the offensive player's card indicates the category of the playing piece being attacked and the opening 76 on the defensive player's card indicates the category of the playing piece which must do the attacking. The cards illustrated in FIG. 9 are for player B and the cards for player A will be mirror images with the openings 74 and 76 located on opposite halves of the card.

In order to guide the selected cards beneath the spans 28 and the probes 32, a pair of generally parallel guides 77 are disposed adjacent each end of the game board 10 for limiting lateral movement of the cards. As illustrated, the cards are placed on the base plate 36 and pushed under the probes 32 manually in step-by-step relationship. However, it is contemplated that structure for advancing the cards automatically could be provided.

In the operation of the game, players A and B place their playing pieces in any desired arrangement on their respective ends of the playing field 14. The players alternate playing offensive and defensive roles during play and at the start of the game one player is designated as the offensive player by mutual consent for the first move. Under these conditions, each player selects the desired card 74 and turns such card upside down so that the indicia thereon is not visible to the opponent. The power switch 40 is moved to the "on" position and the selector switch 71 is moved toward player A so that the light 72 is energized. The energizing of the light 72 indicates that player A is the offensive player. Both players then place their selected cards on the base plate 36 and a downward pressure is applied to the base plate against the tension of the spring 37 to provide a space below the lower ends of the probes 32 which are limited in their downward movement by the stop plates 33. Such space permits the cards to be moved forwardly along the base plates 36 so that the first row of each card is disposed beneath the probes. When the pressure is relieved on the base plate, the spring 37 moves the base plate upwardly. One of the probes extends through the opening 75 of the first row of each card and makes contact with the base plate, while the remaining probes are blocked by the non-conducting material of the cards. If the opening in the first row of player A's card is in the same column as the opening in player B's card, a circuit will be completed to the corresponding light 43, 52, 53, 54, or 55. If the opening 75 of players A's card is not in the same column as the opening in player B's card, then no circuit will be completed and therefore no light will be energized.

Both cards are moved sequentially and simultaneously in step-by-step relation to the second, third, fourth and fifth rows and the number of lights energized is noted. The energizing of any of the light indicates a move of one space to be made by player A. Both cards then are moved to the last row and one of the probes 56–60 will engage the base plate 36 through the opening 76 to energize one of the lights 66–70 of each player. The light energized by player A indicates the category of the playing piece of player B which is being attacked and the light energized by player B indicates the category which player A must use in the attack. As an example, with reference to FIG. 2, player A has used the card in which probe 60 has energized light 70 to indicate that the command post 24 of player B is under attack. Player B has used the card in which probe 56 has energized light 66 to indicate that the attack must be carried out by any one of the troops 20 of player A.

In the illustrated example, the selected cards have openings 75 arranged in a manner that probes 41, 44 and 45 will energize lights 43, 52 and 53; however, probes 46 and 47 will not energize lights 54 and 55. Under these conditions, players A selects one of his troop playing pieces 20 and moves such piece three squares. If player A's move terminates on the square occupied by the piece under attack, then such attacked piece is removed from the board and the attacking player is credited with the point value of such piece. If the move of the attacking player does not terminate on the piece being attacked, then no piece is removed and no credit is given.

After player A has completed his turn, the selector switch 71 is reversed so that light 72 is deenergized and light 73 is energized indicating that player B is on the offense and player A is on the defense. Thereafter new cards 74 are selected by each player and the play is repeated.

If desired, in order to expedite the game, when an offensive player's move terminates on a square occupied by the piece under attack, not only the piece under attack, but any piece occupying a square through which the attacking piece passed is removed and the total point value of all pieces removed is credited to the attacking player.

When a predetermined point value has been reached, the player reaching such value is declared the winner.

Although the invention has been illustrated and described as using cards having openings in predetermined locations or patterns through which the probes 32 extend, it is contemplated that other information containing areas could be provided for each of the cards and that an appropriate information interpreting apparatus could be substituted for the probes 32. As an example, light, sound, or other waves could pass through openings in the selected cards to excite a signal transmitting element mounted in the base to energize the indicators. Also imperforate cards having electrical or magnetic conducting areas and means for transmitting a signal to the indicators through such areas could be provided.

We claim:

1. A game of chance and skill for at least two players comprising a game board having a playing field, a plurality of playing pieces selectively movable on said playing field, each player having a set of selectively usable card means, each of said card means having first and second portions, the first portion of each card means having a plurality of information containing areas, said information relating to a first factor of the game involving all players, the second portion of each card means having at least one information containing area, said information relating to a second factor of the game involving an individual player, the relationship between the areas of said first and second portions being different for each card in said set, spaced means for jointly and simultaneously interpreting the information contained in the first portion of a selected card means of each player and for separately and independently interpreting the information contained in the second portion of each selected card means to determine the information imparted by the combination of the card means of each player, and means for producing perceptible signals in accordance with the result of the interpretation, whereupon said playing pieces may be selectively moved on said playing field by said players in accordance with the signals.

2. The structure of claim 1 in which said playing pieces are separated into a plurality of different categories.

3. The structure of claim 2 in which each category contains a different number of playing pieces.

4. The structure of claim 1 in which said means for interpreting the information areas on said card means and producing perceptible signals includes bridge means, an electroconductive base plate located below said bridge means, a plurality of vertically movable spaced probes carried by said bridge means and movable into and out of engagement with said base plate under control of said information areas, and electrical circuitry connecting said probes and said base plate to a source of electrical energy and to said signal producing means.

5. The structure of claim 4 in which certain of said probes are positioned to be controlled by said first information areas of said card means, and other probes are positioned to be controlled by said second information areas of said card means.

6. The structure of claim 4 in which said information areas include openings extending through said card means.

7. A game of chance and skill for two players comprising a game board having a playing field thereon, a plurality of playing pieces selectively movable on said playing field, said playing pieces defining a plurality of categories with at least one piece in each category, each player having a set of cards, each set of cards including a group of cards for each category of said playing pieces, a first portion of each of said cards having a plurality of openings located in selected positions and for use in determining the number of moves to be made, a second portion of each card having at least one opening located in a selected position for determining the category of the playing piece to be used, bridge means mounted on each end of said game board, each of said bridge means receiving a selected card from a separate player, a plurality of spaced movably mounted electrical contact means carried by said bridge means, electrical contact plate means disposed below said bridge means, electrical conductors connecting each of said contact means to a source of electrical energy and to said contact plate means to form a plurality of electrical circuits closeable by movement of said contact means through openings in the cards, first indicating means connected to certain of said circuits associated with said first portion of the cards, said first indicating means being energized only by cards in both of said bridge means simultaneously and having similarly positioned openings, second indicating means connected to other circuits associated with said second portion of said cards, and said second indicating means being energized independently by cards in each of said bridge means, whereupon said playing pieces may be selectively moved by said players in accordance with information obtained from said first and second indicating means.

* * * * *